July 7, 1970

M. M. JALMA 3,518,816

GAS SCRUBBING EQUIPMENT

Filed July 17, 1968

Michael M. Jalma
INVENTOR

BY Sperry and Zoda
ATTORNEY

July 7, 1970 M. M. JALMA 3,518,816
GAS SCRUBBING EQUIPMENT
Filed July 17, 1968 3 Sheets-Sheet 2
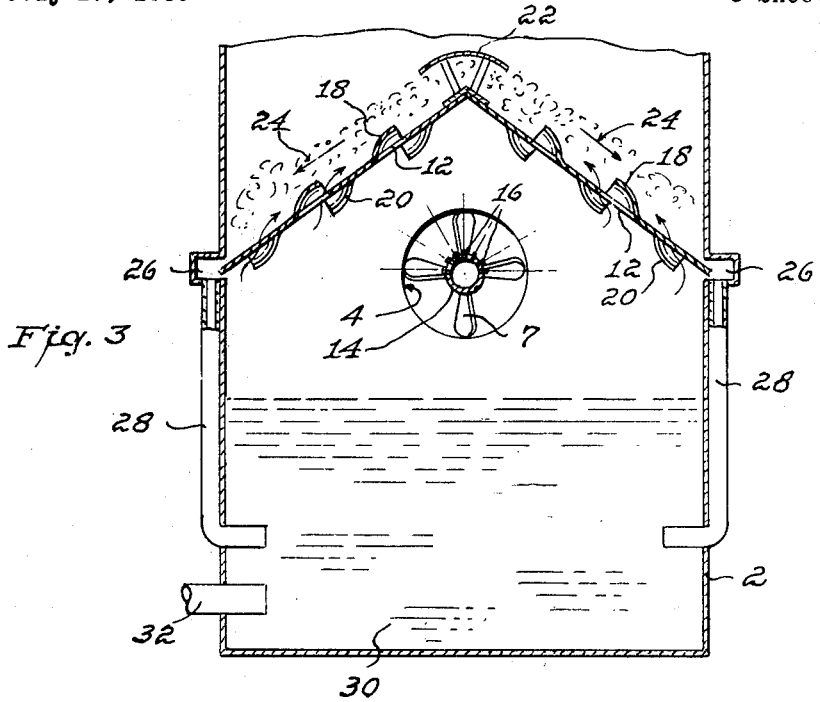
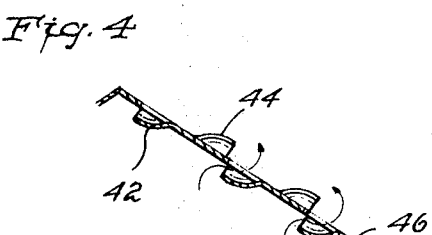
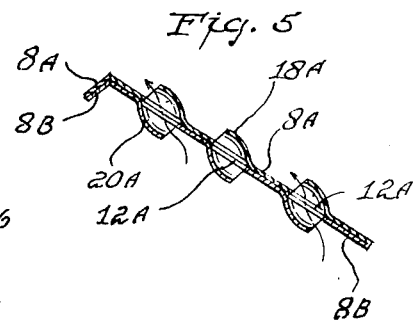
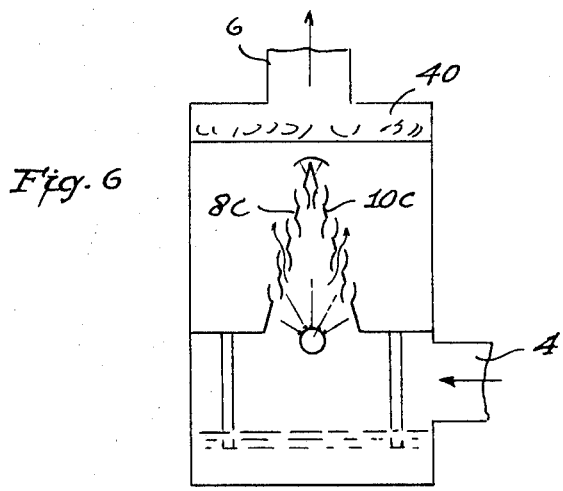
Michael M. Jalma
INVENTOR
BY Sperry and Zoda
ATTORNEY July 7, 1970  M. M. JALMA  3,518,816
GAS SCRUBBING EQUIPMENT
Filed July 17, 1968  3 Sheets-Sheet 3

Michael M. Jalma
INVENTOR

BY Sperry and Zinda
ATTORNEY

United States Patent Office 3,518,816
Patented July 7, 1970

3,518,816
GAS SCRUBBING EQUIPMENT
Michael M. Jaima, 410 Brookside Place,
Cranford, N.J. 07016
Filed July 17, 1968, Ser. No. 745,567
Int. Cl. B01d 47/06
U.S. Cl. 55—240                 2 Claims

ABSTRACT OF THE DISCLOSURE

Gas scrubbing equipment in which gas and a scrubbing liquid are passed upward through a stationary inclined plate having openings therein provided with deflecting surfaces engaged by the gas and liquid as they pass through the openings. The scrubbing liquid is caused to flow in opposite directions across the surface of the plate and over the openings therein in a manner to create vigorous turbulence in the liquid while it is in contact with the gases being scrubbed.

FIELD OF THE INVENTION

The scrubbing of gases, smoke and fumes to eliminate solid matter and pollutants presents many difficulties by reason of the fact that considerable power is generally expended in rotating or moving mechanical elements to create an intimate contact between gases and scrubbing liquid. Moreover, prior equipment has frequently imposed such restrictions to the flow of gas therethrough as to create back pressures which interfere with the draft or normal operation and flow of gases from a furnace, chimney, or other installation with which the gas scrubbing equipment is used.

In accordance with the present invention means are provided for creating an intimate contact between washing liquid and the gases to be scrubbed without resort to the use of any moving parts other than a pump and blower. Moreover, the area of the passage through the equipment through which the gases and liquids flow is sufficiently extended to avoid the development of objectionable back pressure or interference with the fluid flow through the passages.

This result is attained by subjecting the gases to the action of a vigorous spray of scrubbing liquid which is forcibly projected through the gases and into impinging contact with a surface having passages therethrough which are provided with deflecting members for causing the gas and liquid to be directed over the surfaces in which the openings are formed. At least a portion of the scrubbing liquid is caused to flow in opposite directions over the surfaces and openings in a manner to create active turbulence in the liquid coming in contact with the gases being scrubbed whereby the solids and contaminants therein are effectively removed from the gases.

THE DRAWINGS

FIG. 3 is a vertical sectional view taken on the line 3—3 of FIG. 2;

FIG. 4 is an enlarged sectional view illustrating a portion of an alternative construction which may be employed in the equipment of FIG. 1;

FIG. 5 is a view similar to FIG. 4 illustrating a further alternative construction which may be used in equipment embodying the present invention;

FIGS. 6, 7 and 8 are diagrammatic cross-sectional views through alternative forms of equipment embodying the present invention.

PREFERRED EMBODIMENTS OF THE INVENTION

Figure 1:
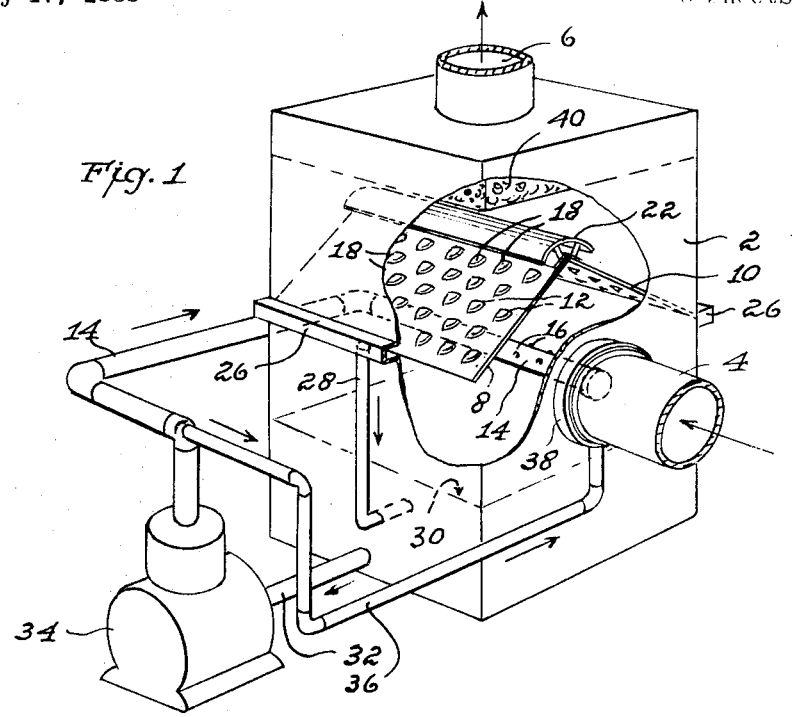
FIG. 1 is a perspective view showing a typical form of equipment embodying the present invention with a portion of the housing broken away.
Figure 2:
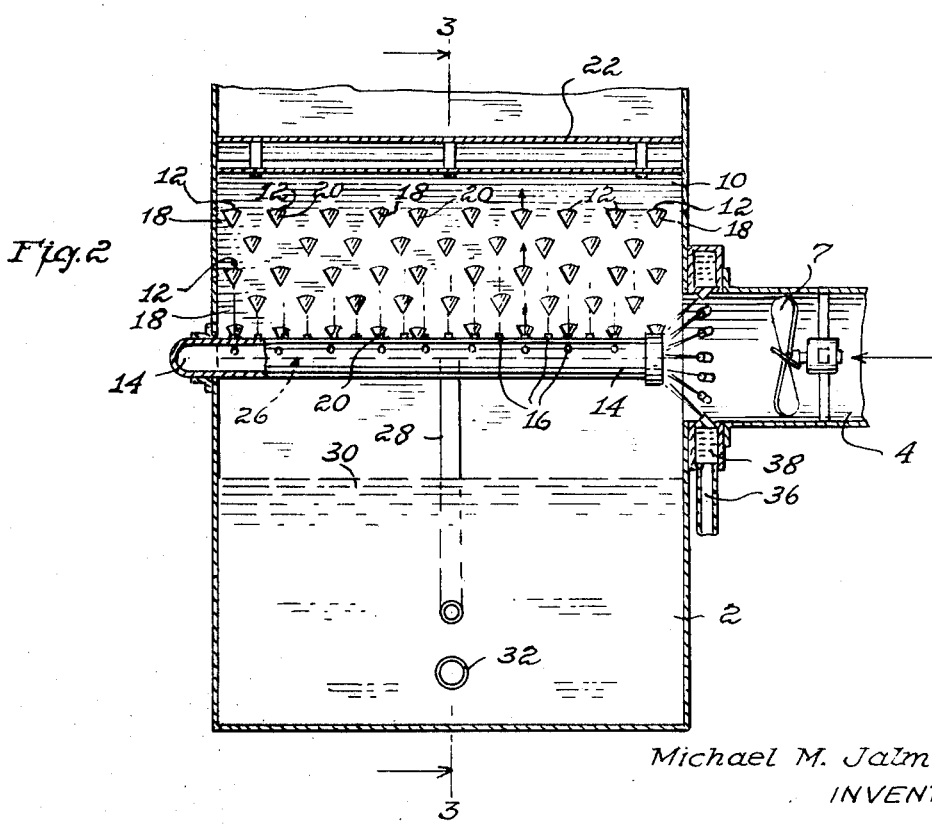
FIG. 2 is a transverse sectional view through the lower portion of the equipment illustrated in FIG. 1.

In that form of the invention chosen for purposes of illustration in FIG. 1, 2 and 3 of the drawing, the equipment embodies a chamber or housing 2 having a gas inlet 4, and a gas outlet 6. The housing as shown is arranged with a generally vertical axis and the gas is introduced into the lower portion of the chamber and passes out through the outlet at the upper portion of the chamber. If desired, a blower 7 or the like may be used to force the gases through the equipment. A stationary member 8 is located in the chamber 2 between the lower inlet 4 and the upper outlet 6 and is arranged in an inclined position with respect to the direction of flow of the gas through the chamber 2 from the inlet to the outlet. As illustrated, there are in fact, two inclined members indicated at 8 and 10 which are disposed in inclined positions and preferably are located in positions inclined at an angle of about 90° with respect to each other. However, the members 8 and 10 may be located in any preferred inclined positions at angles which may vary between about 15° and 135° with respect to each other. Each of the members 8 and 10 is provided with a plurality of openings 12 through which gas may flow from beneath the members 8 and 10 to the space above said members. Gas scrubbing liquid is introduced into the chamber 2 through a pipe 14 provided with nozzles 16 or the like, through which the washing liquid is projected forcibly against the inner surfaces of the members 8 and 10.

As shown in FIG. 3, the openings 12 in the members 8 and 10 are preferably provided with deflecting elements 18 which project upwardly and outwardly from points adjacent the lower edges of the openings 12 to cause gas and liquid flowing through the openings 12 to be deflected in a direction which causes them to flow generally parallel to the upper surface of the members 8 and 10. Similarly, if desired, further inwardly projecting deflecting members 20 may be formed so as to extend downwardly and inwardly from points adjacent the upper edges of the openings 12 to aid in directing liquid and gases flowing upward through the openings 12 along the outer surface of the members 8 and 10. An upper barrier 22 is preferably located near the upper edges of the members 8 and 10 and extends transversely thereof into position to be engaged by the liquid flowing through the openings 12 and upward over the outer surfaces of the members 8 and 10. The barrier 22 serves to interrupt the upward flow of the liquid over the surface of the members 8 and 10 whereby the direction of flow of the scrubbing liquid is reversed under the action of gravity and the scrubbing liquid then flows downwardly over the upper surface of the members 8 and 10 in the direction indicated by the arrows 24, so as to flow countercurrent to the gas and liquid issuing through the openings 12 in the members 8 and 10. In this way, extreme turbulence of the scrubbing liquid in contact with the gas is established and portions of the downwardly flowing liquid may tend to flow inward through the openings 12 to the lower surface of the members 8 and 10. In this way, the gases being scrubbed are effectively brought into scrubbing contact with vigorously agitated and turbulent liquids tending to flow in opposite directions over the surfaces of the members 8 and 10.

The opposite ends of the members 8 and 10 are located in abutting contact with the walls of the chamber 2 and may be sealed by means of caulking material. The lower longitudinal edges of the members 8 and 10 may abut the inner walls of the chamber 2 in which case the washing liquid accumulates near the lower edges and returns to the reservoir 30 in the bottom of the chamber 2 through the lower openings 12 in the members 8 and 10. However, as shown in FIG. 3 the lower edges of members 8 and 10 may terminate adjacent parallel ducts 26 from which pipes 28 extend downward to the liquid reservoir 30 in the bottom of the chamber 2. The scrubbing liquid flowing downward over the upper surfaces of the members 8 and 10 is in any case conducted to the reservoir 30 whereas the liquid flowing downward over the lower surfaces of the members 8 and 10 runs down the inner walls of the lower portion of the chamber 2 so that it also is returned to the reservoir 30.

The scrubbing liquid is withdrawn from the reservoir 30 through a pipe 32 or the like, to a pump 34, which serves to recirculate the scrubbing liquid to the pipe 14 for recirculation and impingement against the lower surfaces of the members 8 and 10. The sprays of scrubbing liquid issuing from the nozzles 16 of the pipe 14 preferably are projected in inclined directions with respect to the lower surfaces of the members 8 and 10. Further, if desired, initial sprays of washing liquid may be directed inwardly about the inlet duct 4 so as to effect an initial scrubbing of the gases which are directed into the lower portion of the chamber 2. For this purpose a washing liquid supply pipe 36 receiving scrubbing liquid from the pump 34 is connected to an annular chamber 38 surrounding the gas inlet 4 and provided with openings or nozzles or the like for injecting a curtain of scrubbing liquid into the gases entering the chamber through the gas inlet 4.

The upper portion of the chamber 2 is preferably provided with a mist eliminator 40 which may consist of baffles, fiberglass or the like. The mist eliminator serves to prevent droplets of scrubbing liquid from passing upward and outward through the gas outlet 6. The mist eliminator 40 may take any of various forms, but it has been found in practice that a bed of fibrous material a few inches in thickness is effective in preventing excessive moisture from remaining in the gases issued through the gas outlet 6.

While the arrangement of the members 8 and 10 and the deflecting elements 18 and 20 thereon as shown in FIG. 3, is generally preferred, the arrangement of the deflecting members may be reversed as illustrated in FIG. 4. When this construction is used the deflecting members 42 and 44 cooperate to direct the scrubbing liquid downward over the outer surface of the member 46 so as to accomplish a more immediate separation of the gases being scrubbed from the liquid used in washing the gases.

In a further alternative construction the members 8 and 10 may be formed of two layers of material as shown in FIG. 5 wherein the deflectors 18A are formed on an upper member 8A and deflectors 20A are formed on an inner member 8B. In this construction the deflectors 18A and 20A overlap to form passages 12A through which the gas and liquid pass in the form of jets projected over the upper surface of the member 8A.

Figure 7:
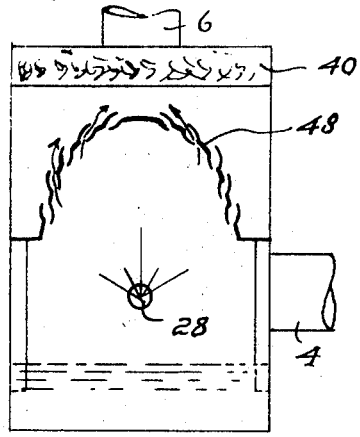
Figure 8:
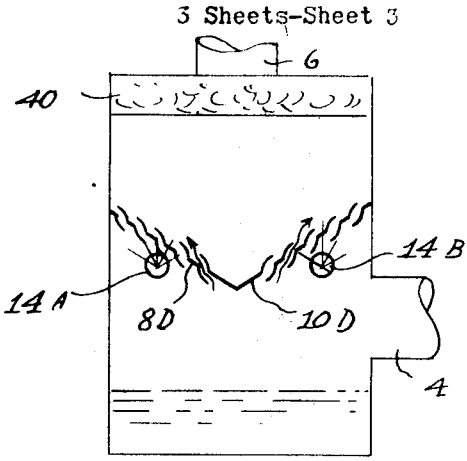

In the alternative construction shown diagrammatically in FIG. 6 the members 8C and 10C are of greater length and are inclined with respect to each other at a relatively small angle—say 30°. As an alternative shown in FIG. 7 the members 8 and 10 may be replaced by a single curved member 48 formed with openings and deflectors similar to those of FIGS. 3, 4 or 5. An additional construction use as an alternative is illustrated diagrammatically in FIG. 8 wherein the members 8D and 10D are located in inverted positions wherein they extend upwardly and outwardly from a central line to the opposite sides of the chamber and two washing liquid spray pipes 14A and 14B are employed for projecting the washing liquid against the lower surface of the members 8D and 10D.

Figure 9:
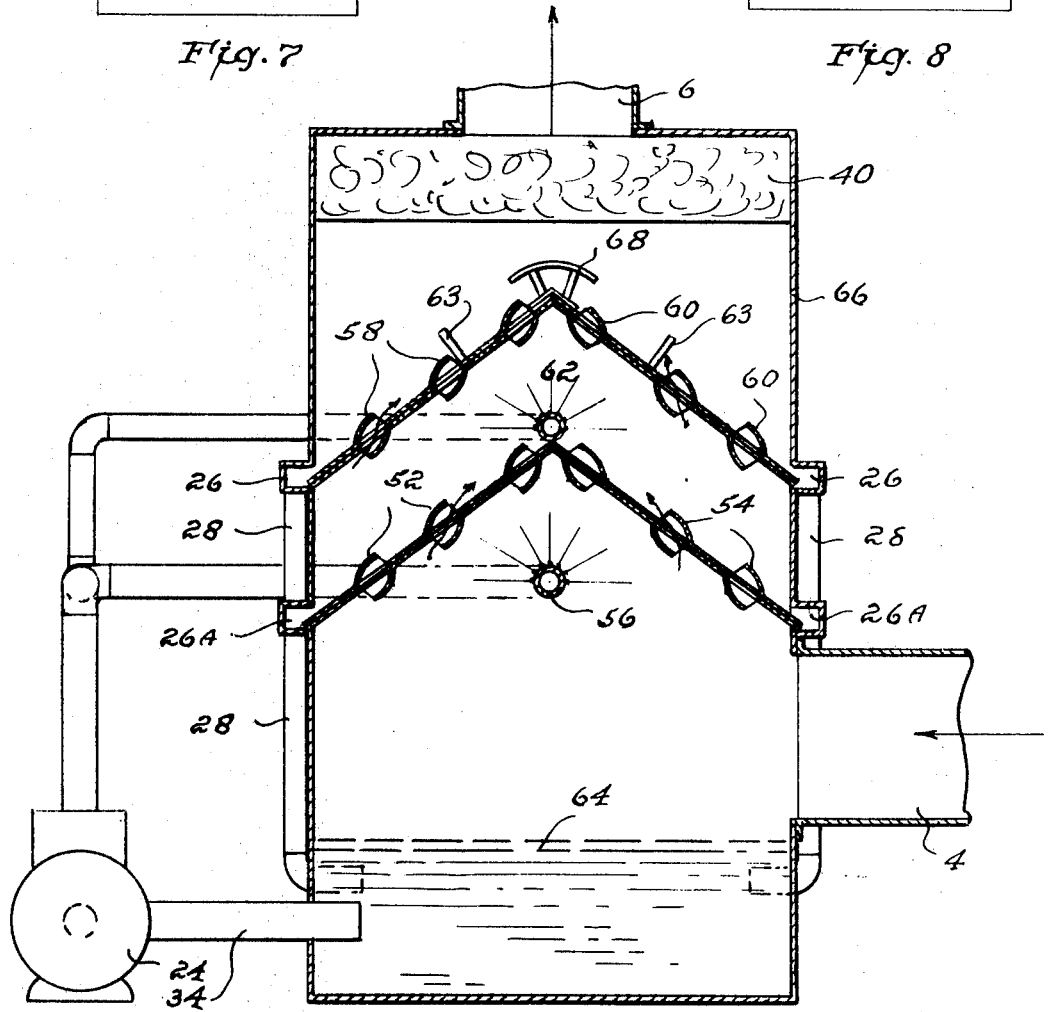
FIG. 9 is a diagrammatic sectional view through a further alternative embodiment of the present invention.

In the alternative form of the invention illustrated diagrammatically in FIG. 9, the equipment is provided with a plurality of pairs of members arranged in inclined positions, one above the other. Thus, the members 52 and 54 are located above the spray pipe 56, whereas the members 58 and 60 are located above and generally parallel to the members 52 and 54. A supplemental liquid supply pipe 62 may then be located beneath the members 58 and 60. The supply pipe 62 in this instance serves as the liquid barrier for preventing continued upward flow of scrubbing liquid over the upper surfaces of the members 52 and 54, whereby the scrubbing liquid is caused to flow downward over the upper surfaces of the members 52 and 54 so as to return to the reservoir of scrubbing liquid 64 in the bottom of the chamber 66. In a similar way, a barrier 68 is located above the members 58 and 60 in position to cause the scrubbing liquid to flow downwardly over the upper surfaces of the members 58 and 60 to return to the reservoir 64.

Further, as shown in FIG. 9 of the drawings, the members 52 and 54 and the members 58 and 60 may be provided with supplemental barriers 63 which project upwardly and outwardly on the outer sides of the members in a manner to form riffles on the outer surface of the members 58 and 60 to interrupt or retard the downward flow of liquid over the outer surfaces thereof. The gas and liquid deflecting elements may project inwardly on one or more of the members 52, 54, 58, and 60 as indicated at 20 in FIG. 3. As a further alternative, one or more of the members 52, 54, 58, and 60 may be formed with deflecting members as illustrated in FIG. 3, whereas other members in the assembly may be provided with deflecting elements as indicated in FIG. 4. Thus, the form construction and arrangement of the deflecting elements on the various members embodied in equipment in accordance with the present invention may be varied as desired for any particular installaton.

It will also be appreciated that a single member corresponding to 8 or 10 may be positioned in an inclined location within the scrubbing chamber or the number and arrangement of the elements may be multiplied or increased as desired, depending upon the character of the gases to be scrubbed and the volume of the gases being circulated through the equipment.

In each of the forms of the invention described, the scrubbing action is effected without resorting to the use of any moving parts other than the pump employed for circulating the scrubbing liquid. Furthermore, by inclining the members 6, 8, 52, 54, 58, 60, etc. at various angles with respect to the direction of flow of the gases through the equipment, it is possible to present a very extended scrubbing surface and an extremely large number of openings through the members so as to reduce the resistance to flow of gas through the equipment. Moreover, the angle of inclination of the various members can be adjusted to cause the scrubbing liquid flowing downward over the upper surfaces of the members and countercurrent to the flow of gases to travel more rapidly as it flows over the openings so as to create a high degree of turbulence in the liquid contacting the gases flowing through the openings.

In typical tests of equipment embodying the present invention, gases in which talc had been suspended, were supplied to the equipment at the rate of from about 500 to 1100 cubic ft. per minute. The rate at which the talc was fed into the gases supplied to the equipment varied from about 50 to 250 grams per minute. The supply of the washing liquid to the equipment varied from about 4 to 10 gallons per minute under pressures of about 30 pounds per square inch. The pressure drop across the equipment from the inlet 4 to the outlet 6 in thus operating the equipment varied from about 2.5 to 9 inches of water indicating that the back pressure imposed on the gases was far below that normally encountered in gas scrubbing equipment of the prior art. Under these conditions it was found that the efficiency of the equipment in removing the suspended talc from the gases supplied to the equipment varied from about 90 to 99%. Thus, the equipment very effectively eliminated the suspended material from the gases treated in the equipment and the efficiency of removal is extremely high. On the other hand, the equipment does not embody any moving parts and the only power required for effecting the removal of the suspended material from the gases is that used in circulating the scrubbing liquid from the reservoir 26 through the spraying pipe 14, 34, 56 and 62. The cost of the equipment and the expense involved in operating the same are thus reduced to a minimum.

In some instances the equipment of the present invention can be arranged in multiple relation with a plurality of inclined members located in side-by-side relation within a chamber. In other assemblies the equipment may be arranged in series with the gas issuing from the outlet of one chamber entering the inlet of another chamber to afford a multiple scrubbing action on the gas.

I claim:

1. A gas scrubber comprising a vertical housing having a gas inlet adjacent the bottom of the housing and a gas outlet at the top, a pair of perforated flat plates inclined in opposite directions and meeting in an apex so as to present an inverted V-shaped arrangement extending across the housing between said gas inlet and said gas outlet, deflecting elements located on the upper surfaces of said plates adjacent each of the perforations and arranged to deflect liquid passing through the perforations in a direction upwardly over the upper surfaces of said plates towards said apex, means at the apex of said plates for directing liquid downwardly over the upper surfaces of the plates, and means located within said housing and beneath said plates for spraying scrubbing liquid upwardly against the lower surfaces of said plates.

2. Equipment as defined in claim 1 wherein said members are inclined toward each other at an angle of about 45° and present upper edges meeting in a line extending generally parallel to the means employed for projecting scrubbing liquid against said member and a liquid barrier extending parallel to the upper edges of said members in position to be contacted by liquid moving upward over the upper surface of said member so as to cause such liquid to flow back downward over the upper surfaces of said members.

References Cited

UNITED STATES PATENTS

| | | | |
|---|---|---|---|
| 139,665 | 6/1873 | Frazier | 261—109 |
| 2,675,215 | 4/1954 | Otto | 55—445 |
| 2,709,580 | 5/1955 | Kameya | 261—112 |
| 3,177,634 | 4/1965 | Latham et al. | 55—443 |
| 3,175,340 | 3/1965 | Schulze | 55—94 |
| 3,266,224 | 8/1966 | Ferretti | 55—241 |
| 3,323,290 | 6/1967 | Stern | 55—235 |
| 3,395,656 | 8/1968 | Ford et al. | 55—220 |
| 3,409,409 | 11/1968 | Sackett | 55—233 |
| 3,024,012 | 3/1962 | Hardcastle et al. | 261—111 |
| 1,462,343 | 7/1923 | Jenkins. | |
| 2,226,127 | 12/1940 | Harmon | 55—235 |
| 3,077,714 | 2/1963 | McIlvaine | 55—257 |
| 3,410,195 | 11/1968 | King. | |

FOREIGN PATENTS 380,099   8/1932   Great Britain.

FRANK W. LUTTER, Primary Examiner

B. NOZICK, Assistant Examiner

U.S. Cl. X.R.

55—259, 438; 261—111, 116